(12) United States Patent
Tatemori et al.

(10) Patent No.: US 7,872,708 B2
(45) Date of Patent: Jan. 18, 2011

(54) LIQUID CRYSTAL DISPLAY DEVICE AND PROJECTION-TYPE DISPLAY DEVICE

(75) Inventors: Yumiko Tatemori, Kanagawa (JP); Hiroyoshi Tsubota, Kanagawa (JP); Fumiaki Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 176 days.

(21) Appl. No.: 12/162,654

(22) PCT Filed: Nov. 26, 2007

(86) PCT No.: PCT/JP2007/072757
§ 371 (c)(1),
(2), (4) Date: Jul. 30, 2008

(87) PCT Pub. No.: WO2008/069036
PCT Pub. Date: Jun. 12, 2008

(65) Prior Publication Data
US 2009/0059104 A1    Mar. 5, 2009

(30) Foreign Application Priority Data
Dec. 8, 2006  (JP) .............................. 2006-331563

(51) Int. Cl.
*G02F 1/1335* (2006.01)
(52) U.S. Cl. .......................................... 349/96; 349/98
(58) Field of Classification Search .................... None
See application file for complete search history.

(56) References Cited

U.S. PATENT DOCUMENTS

| | | | |
|---|---|---|---|
| 6,094,245 A | 7/2000 | Ochi et al. | |
| 6,847,420 B2 | 1/2005 | Lazarev et al. | |
| 7,355,662 B2 | 4/2008 | Tsujimura et al. | |
| 2004/0070829 A1* | 4/2004 | Kurtz et al. | 359/486 |
| 2006/0098140 A1* | 5/2006 | Lee | 349/98 |

FOREIGN PATENT DOCUMENTS

JP    60-034095    2/1985

(Continued)

OTHER PUBLICATIONS

International Search Report dated Dec. 8, 2006.

*Primary Examiner*—Hemang Sanghavi
(74) *Attorney, Agent, or Firm*—SNR Denton US LLP

(57) ABSTRACT

The problem to be solved is to suppress image quality degradation caused by polarizers and provide improved light fastness.

To solve the above problem, the embodiment of the present invention is a liquid crystal display device. The liquid crystal display device includes a driving-side substrate 1 on which a drive transistor 5, pixel electrode 6 and orientation film are formed. The liquid crystal display device further includes an opposed-side substrate 2 on which an opposed electrode and orientation film are formed. The liquid crystal display device still further includes liquid crystal 4 filled between the pixel electrode 6 of the driving-side substrate 1 and opposed electrode of the opposed-side substrate 2. The liquid crystal display device still further includes a reflective inorganic polarizer 3 formed between the drive transistor 5 and pixel electrode 6 of the driving-side substrate 1. The embodiment of the present invention is also a projection-type display device using the liquid crystal display device.

6 Claims, 6 Drawing Sheets

FOREIGN PATENT DOCUMENTS

| | | |
|---|---|---|
| JP | 63-121823 | 5/1988 |
| JP | 5-088153 | 4/1993 |
| JP | 07-152040 | 6/1995 |
| JP | 07-270782 | 10/1995 |
| JP | 08-285050 | 11/1996 |
| JP | 09-127554 | 5/1997 |
| JP | 10-133196 | 5/1998 |
| JP | 2001-201767 | 7/2001 |
| JP | 2004-245871 | 9/2004 |
| JP | 2005-250430 | 9/2005 |
| JP | 2005-504331 | 10/2005 |

* cited by examiner

FIG. 6 — PRIOR ART
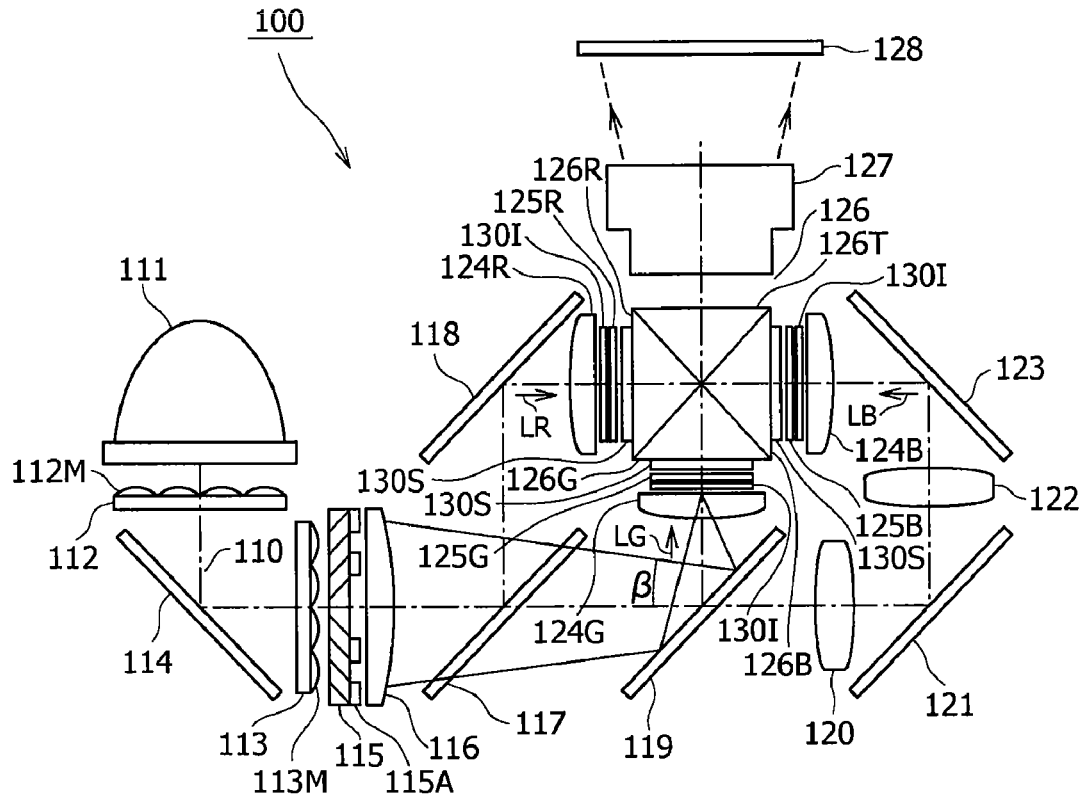
FIG. 7 — PRIOR ART
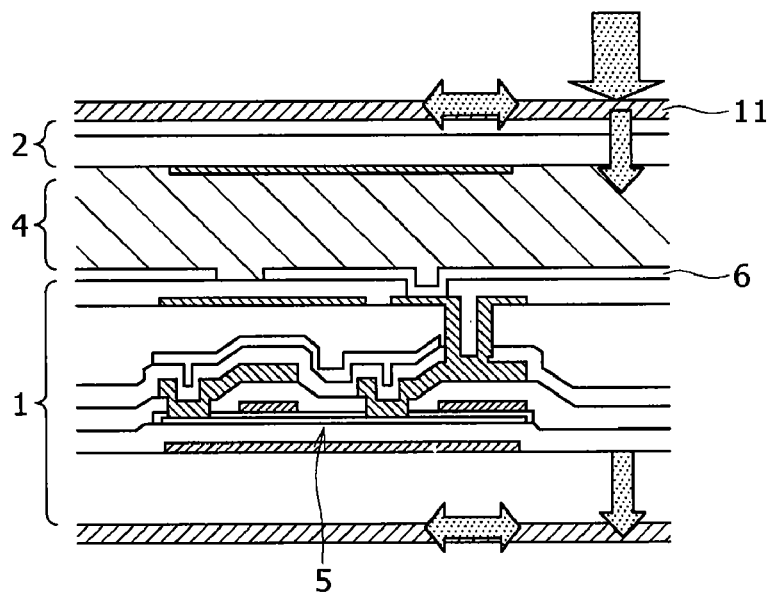

FIG. 8 – PRIOR ART
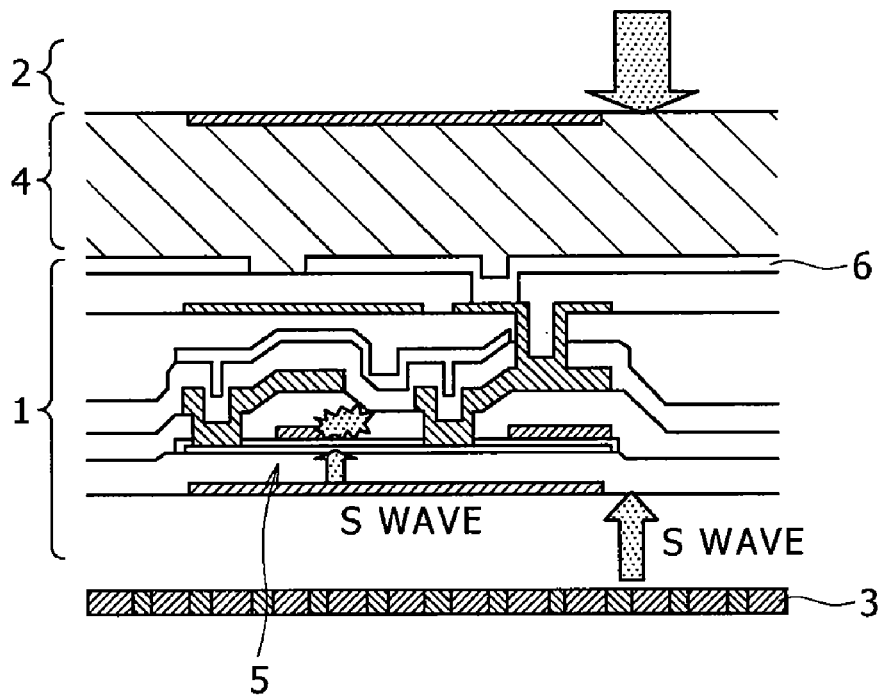
FIG. 9 – PRIOR ART
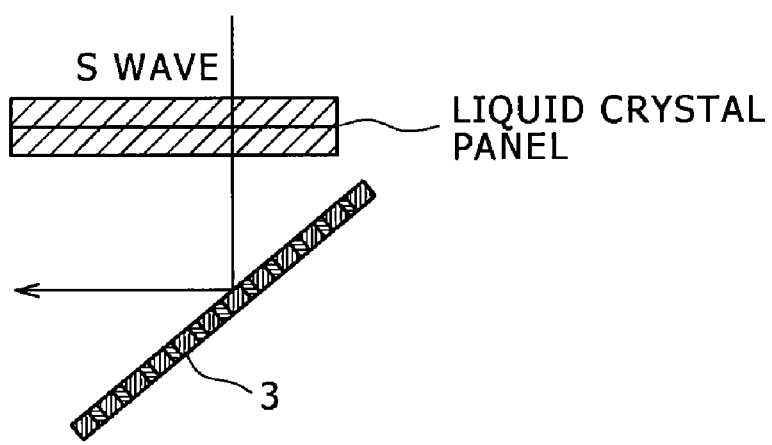

LIQUID CRYSTAL DISPLAY DEVICE AND PROJECTION-TYPE DISPLAY DEVICE

TECHNICAL FIELD

The embodiment of the present invention relates to a liquid crystal display device with liquid crystal filled between a driving-side substrate and opposed-side substrate, and to a projection-type display device using the same.

BACKGROUND ART

A projection-type display device (projector) using a liquid crystal display device has an absorptive organic polarizer on the incident and emitting sides. That is, FIG. 7 is a schematic sectional view describing a related art liquid crystal display device. In this liquid crystal display device, a drive transistor 5, pixel electrode 6 and orientation film are formed on a driving-side substrate 1. In the same device, an opposed electrode and orientation film are formed on an opposed-side substrate 2. The liquid crystal display device is formed by first attaching the driving-side and opposed-side substrates 1 and 2 together with a predetermined gap therebetween and then filling liquid crystal 4 between the pixel electrode 6 of the driving-side substrate 1 and opposed electrode of the opposed-side substrate 2. On the other hand, an incident-side organic polarizer 11 is disposed on the outside of the opposed-side substrate 2, and an emitting-side polarizer 12 on the outside of the driving-side substrate 1.

However, the organic polarizers 11 and 12 disposed on the incident and emitting sides entails the problems of color fading and image quality degradation with increasing light intensity. Color fading is caused by the breaking of the dye and iodine molecules contained in the organic polarizers. Image quality degradation results from the burning of the protective layer. In the technique disclosed in Japanese Patent Laid-Open No. Hei 10-133196, therefore, an organic pre-polarizer is provided to distribute the optical stress, thus alleviating such stress on the emitting-side polarizer.

Some liquid crystal display devices employ inorganic polarizers to avoid the aforementioned problem of light fastness and other problems with polarizers made of organic materials. A reflective inorganic polarizer may be used on the incident side. However, a reflective inorganic polarizer 3, if disposed on the emitting side or on the outside of the driving-side substrate 1, adversely affects the image quality as a result of the light returning from the polarizer striking the drive transistor 5, as illustrated in FIG. 8.

A possible solution to avoiding the impact of the returning light under consideration is to dispose the emitting-side reflective inorganic polarizer 3 diagonally relative to the driving-side substrate 1 as illustrated in FIG. 9. However, this solution leads to a large device configuration.

On the other hand, absorptive inorganic polarizers have yet to reach a level of practical utility due to their characteristic problems in the visible range (blue range in particular).

DISCLOSURE OF INVENTION

The embodiment of the present invention has been devised in light of the foregoing problems. That is, the embodiment of the present invention is a liquid crystal display device which includes a driving-side substrate on which a drive transistor, pixel electrode and orientation film are formed. The liquid crystal display device further includes an opposed-side substrate on which an opposed electrode and orientation film are formed. The liquid crystal display device still further includes liquid crystal filled between the pixel electrode of the driving-side substrate and opposed electrode of the opposed-side substrate. The liquid crystal display device still further includes a reflective inorganic polarizer formed between the drive transistor and pixel electrode of the driving-side substrate.

In the embodiment of the present invention described above, a reflective inorganic polarizer is provided between the drive transistor and pixel electrode of the driving-side substrate, thus eliminating the need for any polarizer on the outside of the substrate. Further, even a reflective inorganic polarizer can prevent the returning light from the polarizer from entering the drive transistor if disposed between the drive transistor and pixel electrode.

Further, the embodiment of the present invention is a projection-type display device which includes a light source, condensing optical system and projection optical system. The condensing optical system guides light from the light source into a liquid crystal display device. The projection optical system enlarges and projects the light optically modulated by the liquid crystal display device. In order to form the liquid crystal display device, a driving-side substrate and opposed-side substrate are disposed parallel to each other so that orientation films adapted to orient liquid crystal are opposed to each other. Liquid crystal is filled between the driving-side substrate and opposed-side substrate. The driving-side substrate of the liquid crystal display device has a drive transistor and pixel electrode. A reflective inorganic polarizer is formed between the drive transistor and pixel electrode.

Still further, the embodiment of the present invention is a projection-type display device which includes a light source, condensing optical system and projection optical system. The condensing optical system separates light from the light source into a plurality of color beams and guides each color beam into one of a plurality of liquid crystal display devices associated with the color beam. The projection optical system enlarges and projects the light optically modulated by the liquid crystal display devices. In order to form each of the plurality of liquid crystal display devices, a driving-side substrate and opposed-side substrate are disposed parallel to each other so that orientation films adapted to orient liquid crystal are opposed to each other. Liquid crystal is filled between the driving-side substrate and opposed-side substrate. The driving-side substrate of each of the plurality of liquid crystal display devices has a drive transistor and pixel electrode. A reflective inorganic polarizer is formed between the drive transistor and pixel electrode.

In the embodiment of the present invention described above, a reflective inorganic polarizer is provided between the drive transistor and pixel electrode of the driving-side substrate of the liquid crystal display device in the projection-type display device. This eliminates the need for any polarizer on the outside of the substrate, thus allowing for reduction of the component count of the projection-type display device. Further, even a reflective inorganic polarizer can prevent the returning light from the polarizer from entering the drive transistor if disposed between the drive transistor and pixel electrode, thus ensuring improved image quality of the projection-type display device.

Therefore, the embodiment of the present invention offers the following effects. That is, a reflective polarizer can be used on the emitting side without causing any image quality degradation, thus allowing to achieve a higher level of light fastness and to provide a higher level of value to the panel. Further, if reflective polarizers are used on both the incident and emitting sides, there is no need for any separate polarizer, allowing for significant downsizing of the set.

BRIEF DESCRIPTION OF DRAWINGS

FIG. 6 is a diagrammatic view of configuration describing a projection-type display device according to the present embodiment.

FIG. 7 is a view describing the related art (1).

FIG. 8 is a view describing the related art (2).

FIG. 9 is a view describing the related art (3).

BEST MODES FOR CARRYING OUT THE INVENTION

Figure 1:
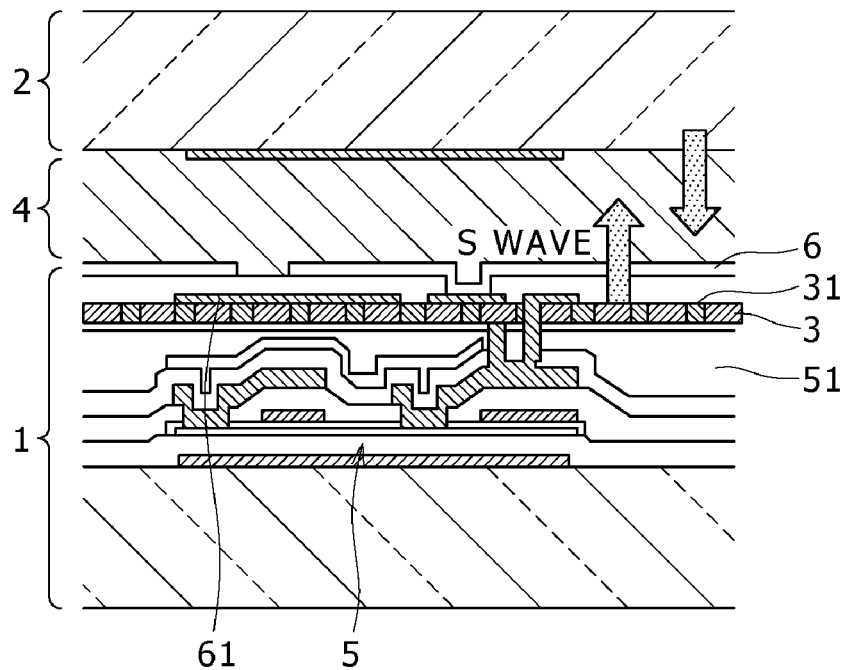
FIG. 1 is a schematic sectional view describing a liquid crystal display device according to a present embodiment.

The preferred embodiment of the present invention will be described below with reference to the accompanying drawings. FIG. 1 is a schematic sectional view describing a liquid crystal display device according to the present embodiment. That is, the liquid crystal display device according to the present embodiment includes the driving-side substrate 1 and opposed-side substrate 2. The drive transistor 5, pixel electrode 6 and orientation film are formed on the driving-side substrate 1. The opposed electrode and orientation film are formed on the opposed-side substrate 2. The liquid crystal display device further includes liquid crystal 4. The liquid crystal 4 is filled between the pixel electrode 6 and opposed electrode with the driving-side substrate 1 and opposed-side substrate 2 attached together. The liquid crystal display device still further includes the reflective inorganic polarizer 3. The reflective inorganic polarizer 3 is formed between the drive transistor 5 and pixel electrode 6 of the driving-side substrate 1. In the liquid crystal display device illustrated in FIG. 1, an orientation film is formed on each of the opposed surfaces of the driving-side substrate 1 and opposed-side substrate 2. However, such films are omitted for easier understanding of the description.

The driving-side substrate 1 has an active layer and insulating layer stacked thereon. These layers make up the drive transistor 5 on the glass substrate. The drive transistor 5 is formed for each pixel by the predetermined techniques such as photolithography and ion injection.

The pixel electrode 6 which has electrical continuity with the drive transistor 5 is controlled by the on/off switching of the drive transistor 5. This permits control of the voltage applied to the liquid crystal 4. Further, a light-shielding film 61 is formed above the drive transistor 5 to prevent undesired light from entering the drive transistor 5.

In the related art configuration, a pixel electrode is formed above a drive transistor via insulating and light-shielding films. In the present embodiment, the reflective inorganic polarizer 3 is formed between the drive transistor 5 and pixel electrode 6. That is, the polarizer disposed on the emitting side is made of an inorganic material. Moreover, the polarizer is fabricated integrally with the driving-side substrate 1.

The layer on which the reflective inorganic polarizer 3 is disposed is not particularly limited. Preferably, however, the reflective inorganic polarizer 3 should be disposed on a planarizing layer 51 formed on top of the drive transistor 5 (on the incident side). Further, the layer of the reflective inorganic polarizer 3 should preferably be fully buried in a protective layer 31 and planarized to avoid any impact on the upper layers.

To fabricate a reflective inorganic polarizer, fine lines are formed on a transparent substrate made of glass, quartz, polymer or other material. The width, height and shape of the fine lines just have to be optimally selected according to the wavelengths of the respective colors (red, green and blue light beams).

The material of the fine lines should be selected from among those which permit patterning at a fine pitch from 100 nm to 500 nm to cover the entire visible range and which function as a reflective polarizer. Further, aluminum or other inorganic conductive material is particularly preferred in consideration of light fastness and other factors.

On the other hand, a material having a low refractive index should be used, to the extent possible, as the medium (protective film 31) adapted to fill the gaps between the fine lines in consideration of ease of manufacturing and feasibility.

If a sufficient extinction ratio wanted for a polarizer may not be provided, for example, because of the materials used as the reflective inorganic polarizer 3 and the medium (protective film 31) adapted to fill the gaps between the fine lines, the reflective inorganic polarizer 3 may be used as a pre-polarizer and incident and emitting polarizers may be separately provided. As described above, even if the reflective inorganic polarizer 3 which is fabricated integrally with the driving-side substrate 1 is used as a pre-polarizer, the reflective inorganic polarizer 3 is disposed closer to the liquid crystal 4 than the drive transistor 5. This allows suppressing image quality degradation, thus ensuring significantly reduced optical stress on the organic polarizer separately disposed on the emitting side.

In the meantime, if the reflective inorganic polarizer 3 can be designed and manufactured to offer an excellent extinction ratio characteristic, the reflective inorganic polarizer 3 may be used as the main polarizer, thus eliminating the need for any other polarizer.

Figure 2:
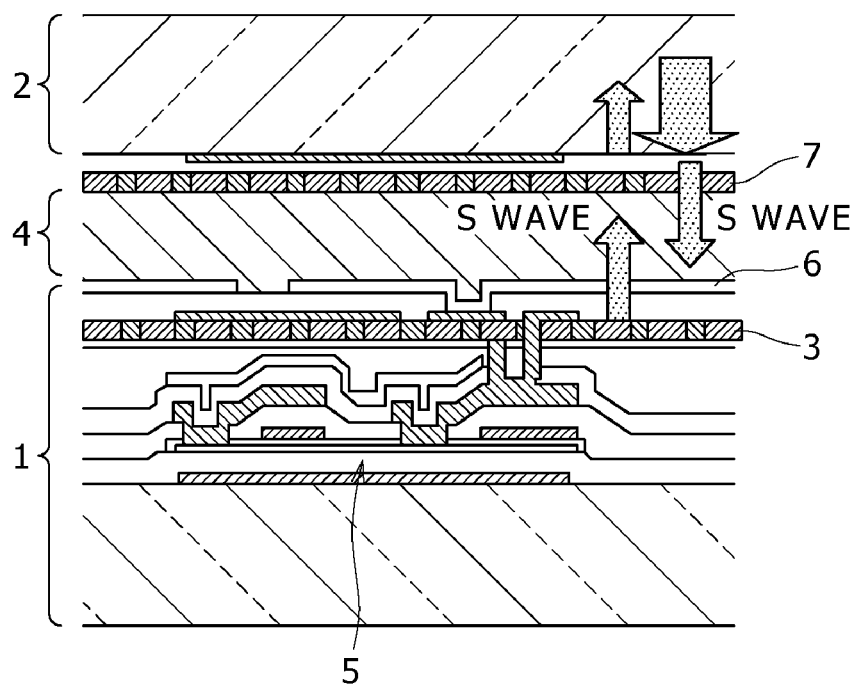
FIG. 2 is a schematic sectional view describing the liquid crystal display device according to another example of the present embodiment.

For example, FIG. 2 is a schematic sectional view describing an example in which the reflective inorganic polarizers 7 and 3 are fabricated integrally with the substrates on the incident and emitting sides, respectively. In this example, the driving-side substrate 1 on the emitting side has the reflective inorganic polarizer 3 disposed between the drive transistor 5 and pixel electrode 6. The opposed-side substrate 2 on the incident side has the reflective inorganic polarizer 7 formed on the side of the liquid crystal 4.

The reflective inorganic polarizer 7 formed on the opposed-side substrate 2 is formed on the layer between the surface of the opposed-side substrate 2 and the orientation film. The reflective inorganic polarizer 7 is provided on the uniformly formed substrate surface or on the surface of the opposed electrode. As a result, the separately formed film-type reflective inorganic polarizer 7 may be attached. Alternatively, the reflective inorganic polarizer 7 may be formed by vapor deposition and photolithography. It should be noted that the fine lines of the reflective inorganic polarizers 3 and 7 provided respectively on the driving-side substrate 1 and opposed-side substrate 2 are actually orthogonal to each other. However, these lines are shown to run in the same direction in FIG. 2 for easier understanding of the description.

As described above, the reflective inorganic polarizers 3 and 7 are fabricated integrally with the driving-side substrate 1 and opposed-side substrate 2, respectively. As a result, there is no need for any separate polarizer, thus allowing manufacturing the polarizing and liquid crystal members fully integral with the panel.

Figure 3A:
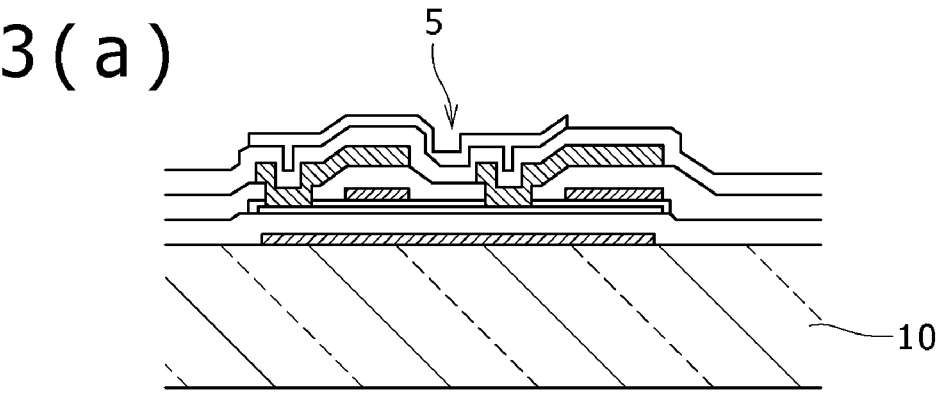
FIG. 3 is a schematic sectional view (1) describing the manufacturing method of the liquid crystal display device according to the present embodiment.

The manufacturing method of the liquid crystal display device according to the embodiment of the present invention will be described next with reference to FIGS. 3 to 5. First, as illustrated in FIG. 3(a), given films are formed on a glass substrate 10 which serves as the driving-side substrate. These films are fabricated into the drive transistor 5 by photolithography, ion injection and other techniques.

Figure 3B:
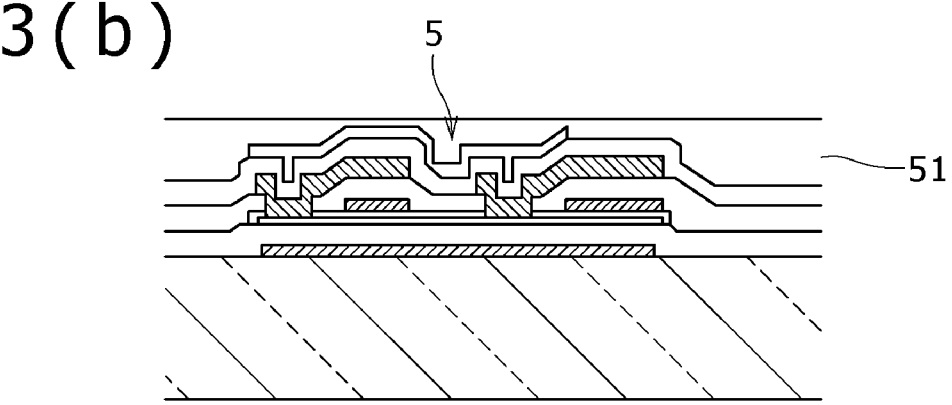

Next, an insulating film (e.g., silicon oxide film) is formed on the drive transistor 5 as illustrated in FIG. 3(b). This film is planarized, for example, by CMP to form the planarizing layer 51. It should be noted that the planarization in this step is important for the accurate formation of the fine lines of the reflective inorganic polarizer in the next step.

Figure 3C:
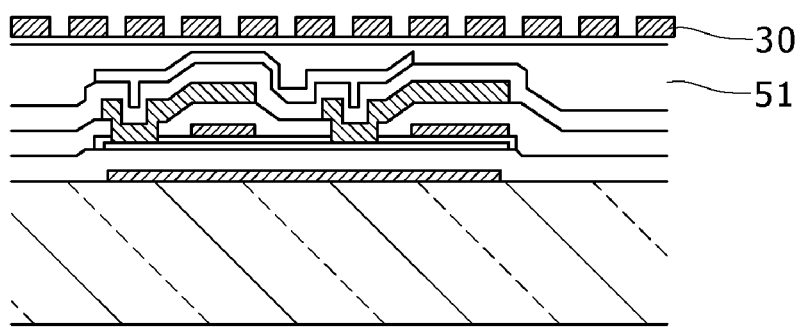

Next, fine lines 30 serving as the reflective inorganic polarizer are formed on the planarizing layer 51 as illustrated in FIG. 3(c). The fine lines 30 are formed in several steps. That is, a photosensitive material is applied in advance first. Then, the areas where the fine lines will be fabricated are removed by photolithography. Next, aluminum or other inorganic conductive material is deposited, for example, by vapor deposition. Finally, the photosensitive material is removed to form the fine lines 30 at a given pitch.

Figure 4A:
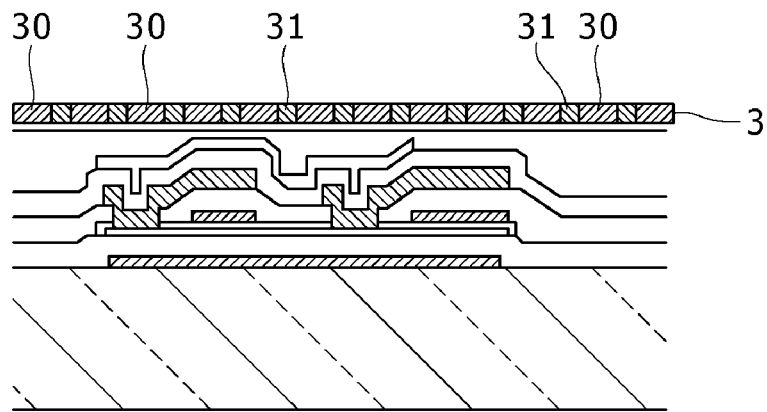
FIG. 4 is a schematic sectional view (2) describing the manufacturing method of the liquid crystal display device according to the present embodiment.

Next, an optical thin film material such as magnesium fluoride is filled between the fine lines to form the protective film 31 as illustrated in FIG. 4(a), thus planarizing the surface. As a result, the reflective inorganic polarizer 3 is formed.

Figure 4B:
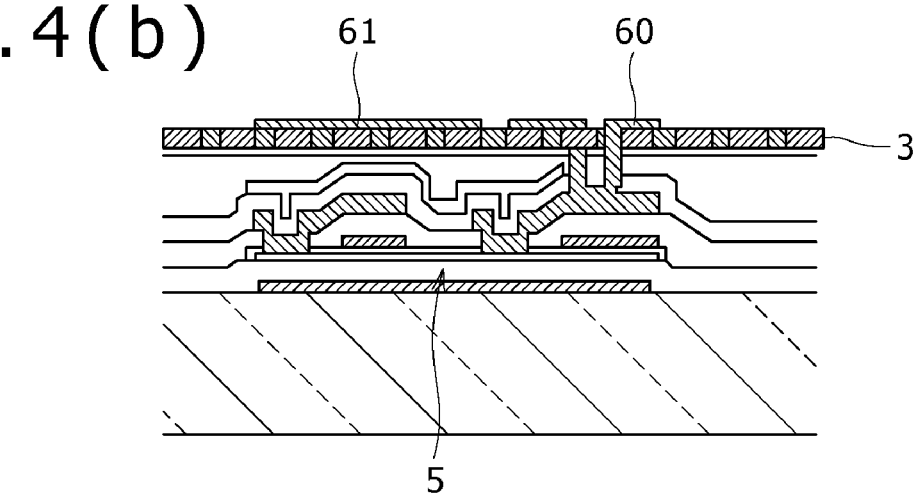

Next, the light-shielding film 61 is formed on a portion of the planarized surface of the reflective inorganic polarizer 3 as illustrated in FIG. 4 (b). This portion is associated with the drive transistor 5. At the same time, a conductive electrode 60 is formed which has electrical continuity with the drive transistor 5.

Figure 4C:
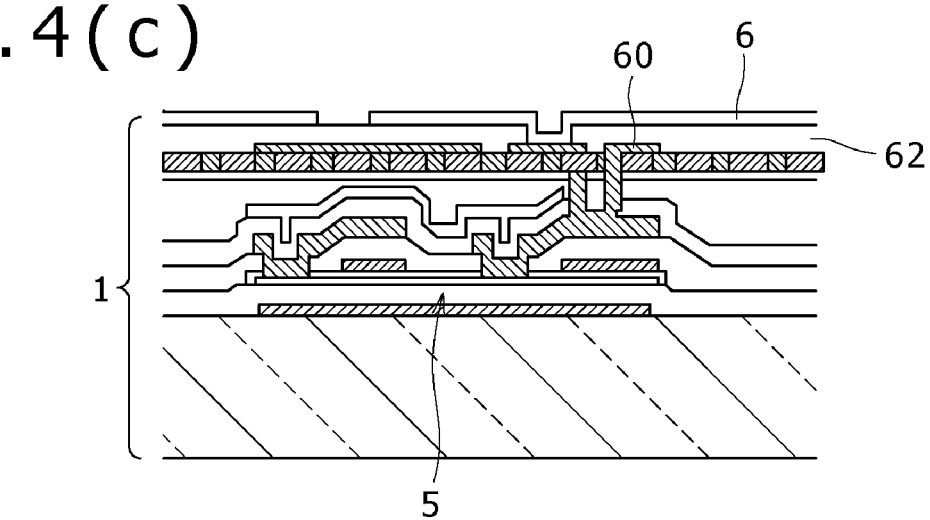

Next, an insulating film 62 made, for example, of silicon oxide is formed on the light-shielding film 61 as illustrated in FIG. 4(c). Then, the pixel electrode 6 is formed on the insulating film 62. The pixel electrode 6 is a transparent electrode (ITO: Indium Tin Oxide). The pixel electrode 6 is connected to the conductive electrode 60 formed earlier to have electrical continuity with the drive transistor 5. Then, an unshown orientation film is formed which is rubbed as necessary.

Figure 5A:
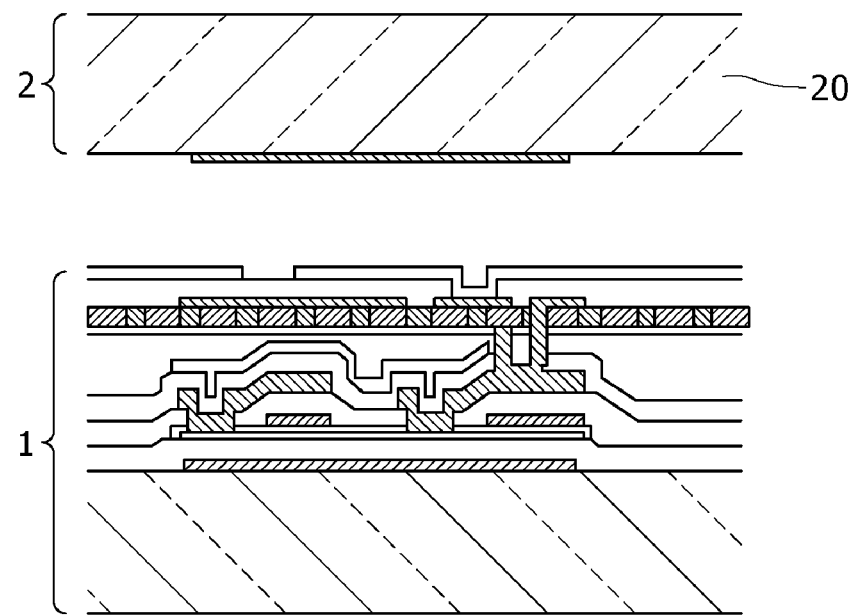
FIG. 5 is a schematic sectional view (3) describing the manufacturing method of the liquid crystal display device according to the present embodiment.

Next, an opposed electrode and unshown orientation film are formed on a glass substrate 20 which serves as the opposed-side substrate 2 as illustrated in FIG. 5(a). Then, the driving-side substrate 1 and opposed-side substrate 2 are disposed face-to-face with each other with a given gap therebetween. The given gap is controlled, for example, by the spacer mixed in the sealing agent used to attach the substrates together. Alternatively, the gap may be controlled by forming an OCS as necessary.

Figure 5B:
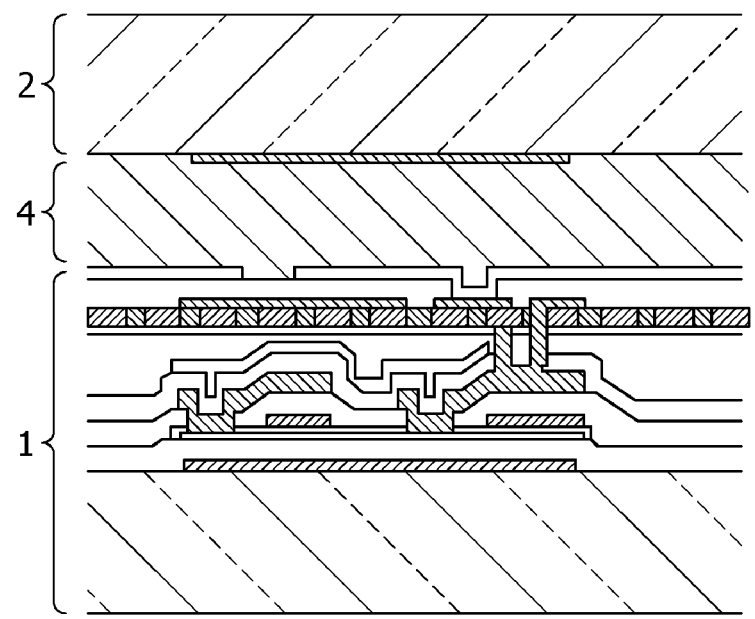

Then, the liquid crystal 4 is injected into the gap formed between the driving-side substrate 1 and opposed-side substrate 2 as illustrated in FIG. 5(b). This provides a complete liquid crystal display device.

It should be noted that if the reflective inorganic polarizer 7 is fabricated integrally with the opposed-side substrate 2 as illustrated in FIG. 2, the reflective inorganic polarizer 7 is provided at the time of forming the opposed-side substrate 2. Then, the driving-side substrate 1 and opposed-side substrate 2 just have to be overlaid one on top of another in this condition, followed by liquid crystal injection.

Further, if the reflective inorganic polarizer 7 is fabricated integrally with the opposed-side substrate 2 as illustrated in FIG. 2, a given pattern may be left unremoved without fabricating some fine lines so that the unremoved pattern can serve also the purpose of a light-shielding film to be provided on the opposed-side substrate 2 for protection against stray light. Alternatively, some fine lines may be rotated 90 degrees to prevent the propagation of undesired light to the screen. Still alternatively, the patterns of the reflective inorganic polarizers 3 and 7 may be electrically grounded to avoid the development of undesired electric field.

The liquid crystal display device according to the present embodiment is used in a projection-type display device such as a projection-type liquid crystal projector as illustrated in FIG. 6.

A liquid crystal projector 100 illustrated in FIG. 6 is a so-called three-plate projector. The liquid crystal projector 100 separates the light from the light source into three primary colors: i.e., red, blue and green. The liquid crystal projector 100 uses an LCD (liquid crystal display device) for each of the three colors to display a color image. Liquid crystal light bulbs, each for one of the three primary colors, correspond to the LCD illustrated in FIG. 1. In the description given below, an LCD adapted to receive the red light is denoted by reference numeral LCD 125R, an LCD adapted to receive the green light by reference numeral LCD 125G, and an LCD adapted to receive the blue light by reference numeral LCD 125(b).

The LCDs 125R and 125(b) each have a liquid crystal layer formed, for example, by sealing liquid crystal with an inorganic sealing agent. These LCDs have no OCS (On Chip Spacer) adapted to control the liquid crystal layer to a given thickness. On the other hand, the LCD 125G for the green light, a highly visible color, has a liquid crystal layer formed, for example, by sealing liquid crystal with an organic sealing agent, thus controlling the gap with accuracy using an OCS.

The liquid crystal projector 100 illustrated in FIG. 6 includes a light source 111 adapted to emit light and first lens array 112 disposed on the emitting side of the light source 111. The liquid crystal projector 100 further includes a mirror 114 adapted to reflect the light emitted from the first lens array 112 and change the optical path of the emitted light (optical path 110) 90 degrees. The liquid crystal projector 100 still further includes a second lens array 113 adapted to receive the reflected light from the mirror 114.

Here, the mirror 114 is preferably a total reflection mirror. The first and second lens arrays 112 and 113 have a plurality of micro lenses 112M and 113M, respectively. The micro lenses 112M and 113M are arranged two-dimensionally.

The first and second lens arrays 112 and 113 are adapted to provide uniform distribution of illuminance. These arrays can split the incident beam into a plurality of small luminous fluxes. It should be noted that an unshown UV (ultraviolet)/IR (infrared) cut filter may be provided between the light source 111 and first lens array 112.

The light source 111 emits white light which contains red, blue and green beams wanted to display a color image. The light source 111 source 111 includes an unshown luminous body adapted to emit white light and reflector adapted to reflect and collect the light from the luminous body.

An ultra high pressure mercury lamp, halogen lamp, metal halide lamp or xenon lamp can be used, for example, as a luminous body. The reflector is preferably shaped to offer high light collecting efficiency. For example, the reflector has a rotationally symmetric concave surface such as spheroidal mirror or rotational parabolic surface. The light emission point of the luminous body is located at the focal point of the concave-surfaced reflector.

The white light emitted from the luminous body of the light source 111 is formed into an approximately parallel beam by the reflector and enters the total reflection mirror 114 via the first lens array 112. The white light enters the second lens array 113 after its optical axis 110 has been bent 90 degrees by the total reflection mirror 114.

The liquid crystal projector 100 illustrated in FIG. 6 has a PS conversion element 115, condenser lens 116 and dichroic mirror 117 on the emitting side of the second lens array 113.

The PS conversion element 115 is an example of a polarization conversion element. The PS conversion element 115 has a plurality of phase difference plates 115(a) provided at the positions associated with the boundaries between the adjacent micro lenses on the second lens array 113. A half-wave plate is an example of the phase difference plate 115(a).

The PS conversion element 115 separates the incident light into p- and s-polarization components. The PS conversion element 115 emits one of the polarizations (e.g., p-polarization component) without changing the polarization direction thereof. The PS conversion element 115 converts another polarization (e.g., s-polarization component) into the other polarization component (e.g., p-polarization component) by the action of the half-wave plates 115(a) and emits the resultant polarization component.

The light from the PS conversion element 115 is collected by the condenser lens 116 and enters the dichroic mirror 117. The dichroic mirror 117 reflects, for example, a red light beam LR in the incident light and transmits the other color beams, thus separating the incident light into the red beam LR and other color beams.

The liquid crystal projector 100 further has a mirror 118, field lens 124R, incident-side polarizer 130I, LCD 125R and emitting-side polarizer 130S arranged along the optical path of the red beam LR separated by the dichroic mirror 117.

Here, a total reflection mirror is used as the mirror 118. The total reflection mirror 118 reflects the red beam LR, separated by the dichroic mirror 117, toward the incident-side polarizer 130I and LCD 125R.

The incident-side polarizer 130I transmits the portion of the incident red beam LR from the total reflection mirror 118 whose direction matches the direction of a polarization axis 130a.

The LCD 125R has the same construction as the aforementioned liquid crystal display device. The LCD 125R spatially modulates the red beam LR, received via the incident-side polarizer 130I provided as necessary, according to the input image data.

The emitting-side polarizer 130S which is provided as necessary, on the other hand, transmits the portion of the modulated red beam LR from the LCD 125R whose direction matches the direction of a polarization axis 130b.

The liquid crystal projector 100 has a dichroic mirror 119 arranged along the optical path of the other color beams separated by the dichroic mirror 117. The dichroic mirror 119 reflects a green beam LG of the incident light and transmits a blue beam LB thereof, thus separating the incident light into the green and blue beams LG and LB.

A field lens 124G, the incident-side polarizer 130I, the LCD 125G and the emitting-side polarizer 130S are provided along the optical path of the green beam LG separated by the dichroic mirror 119. It should be noted that the incident-side polarizer 130I and emitting-side polarizer 130S are provided as necessary.

The incident-side polarizer 130I transmits the portion of the incident green beam LG from the dichroic mirror 119 whose direction matches the direction of the polarization axis 130a. The LCD 125G spatially modulates the green beam LG received via the incident-side polarizer 130I according to the input image data. The emitting-side polarizer 130S transmits the portion of the modulated green beam LG from the LCD 125G whose direction matches the direction of the polarization axis 130b.

Further, a relay lens 120, a mirror 121, a relay lens 122, a mirror 123, a field lens 124(b), the incident-side polarizer 130I, the LCD 125(b) and the emitting-side polarizer 130S are provided along the optical path of the blue beam LB separated by the dichroic mirror 119. It should be noted that the incident-side polarizer 130I and emitting-side polarizer 130S are provided as necessary.

The mirrors 121 and 123 are preferably total reflection mirrors. The total reflection mirror 121 reflects the blue beam LB, received via the relay lens 120, toward the total reflection mirror 123. The total reflection mirror 123 reflects the blue beam LB, reflected by the total reflection mirror 121 and received via the relay lens 122, toward the incident-side polarizer 130I and LCD 125(b).

The incident-side polarizer 130I transmits the portion of the incident green beam LG from the total reflection mirror 123 whose direction matches the direction of the polarization axis 130a. The LCD 125(b) spatially modulates the blue beam LB reflected by the total reflection mirror 123 and received via the field lens 124(b) according to the input image data.

The emitting-side polarizer 130S transmits the portion of the modulated blue beam LB from the LCD 125(b) whose direction matches the direction of the polarization axis 130b. A cross prism 126 is provided where the optical paths of the red, green and blue beams LR, LG and LB intersect each other. The cross prism 126 can combine these color beams.

The cross prism 126 includes, for example, four right angle prisms joined together. Each of the prisms has incident surfaces 126R, 126G and 126B which receive the red, green and blue beams LR, LG and LB, respectively. Each of the prisms further has an emitting surface 126T which emits the combined light of the red, green and blue beams LR, LG and LB.

In the liquid crystal projector 100, the joined surface of each of the right angle prisms is coated with a dichroic film. As a result, the cross prism 126 transmits the incident green beam LG toward the emitting surface 126T and reflects the red and blue beams LR and LB toward the emitting surface 126T. This permits the cross prism 126 to combine the three color beams entering the incident surfaces 126R, 126G and 126B to emit the combined beam from the emitting surface 126T.

Further, the liquid crystal projector 100 has a projection lens 127 adapted to project the combined beam from the cross prism 126 toward a screen 128. The projection lens 127 preferably includes a plurality of lenses and has zooming and focusing functions. The zooming function permits the adjustment of the image size projected onto the screen 128.

A reflective inorganic polarizer is incorporated in the liquid crystal display device according to the present embodiment. Therefore, if the liquid crystal display device is used in the liquid crystal projector 100 configured as described above as its LCD and if the reflective inorganic polarizer is used as a pre-polarizer, the optical stress on the incident-side polarizer 130I and emitting-side polarizer 130S can be significantly reduced. This provides improved durability of the liquid crystal projector 100 as a whole.

In the meantime, if the reflective inorganic polarizer 3 can be designed and manufactured to offer an excellent extinction ratio characteristic, the reflective inorganic polarizer 3 may be used as the main polarizer, thus eliminating the need for the incident-side polarizer 130I and emitting-side polarizer 130S. This allows for reduction of the component count and downsizing of the liquid crystal projector 100.

The embodiment of the present invention has been described with reference to an embodiment of a transmissive LCD and a projection-type display device associated therewith. However, a reflective LCD may be combined with a projection-type display device. Further, other projection-type display devices may also be used. Such projection-type display devices include one which uses a liquid crystal display device for each color of RGB and another which uses just one liquid crystal display device to display a monochrome image.

The invention claimed is:

1. A liquid crystal display device comprising:
   a first substrate on which a drive transistor, a pixel electrode and a first orientation film are formed;
   a second substrate on which a counter electrode and a second orientation film are formed, the second substrate facing the first substrate;
   a liquid crystal filled between the pixel electrode of the first substrate and the counter electrode of the second substrate; and
   a reflective inorganic polarizer layer in-between the drive transistor and pixel electrode.

2. The liquid crystal display device of claim 1, wherein the second substrate has an incident-side reflective inorganic polarizer layer.

3. The liquid crystal display device of claim 2, wherein the incident-side reflective inorganic polarizer layer is provided on the side of the liquid crystal of the second substrate.

4. The liquid crystal display device of claim 1, wherein a part of the reflective inorganic polarizer layer is a light-shielding film effective to protect the drive transistor from light.

5. A projection-type display device comprising:
   a light source;
   a condensing optical system adapted to guide light from the light source into a liquid crystal display device; and
   a projection optical system adapted to project the light optically modulated by the liquid crystal display device,
   wherein,
   the liquid crystal display device, includes a first substrate and a second substrate facing each other and a liquid crystal between the first substrate and the second substrate,
   the first substrate of the liquid crystal display device has a drive transistor and a pixel electrode, and
   a reflective inorganic polarizer layer in-between the drive transistor and the pixel electrode.

6. A projection-type display device comprising:
   a light source;
   a condensing optical system adapted to separate light from the light source into a plurality of color beams and guide each color beam into one of a plurality of liquid crystal display devices associated with the color beam; and
   a projection optical system adapted to enlarge and project the light optically modulated by the liquid crystal display devices,
   wherein,
   each of the plurality of liquid crystal display devices includes a first substrate and a second substrate facing each other, and a liquid crystal between the first substrate and the second substrate,
   the first substrate of each of the plurality of liquid crystal display devices has a drive transistor and a pixel electrode, and
   a reflective inorganic polarizer layer in between the drive transistor and the pixel electrode.

* * * * *